United States Patent [19]

Stromer et al.

[11] Patent Number: 5,391,021
[45] Date of Patent: Feb. 21, 1995

[54] HAY BALER AERATOR

[75] Inventors: Velere D. Stromer, Klemme; Harold R. Winston, Mason City, both of Iowa

[73] Assignee: Quality Hay of Iowa, Co., Mason City, Iowa

[21] Appl. No.: 177,412

[22] Filed: Jan. 5, 1994

Related U.S. Application Data

[62] Division of Ser. No. 10,008, Jan. 27, 1993, Pat. No. 5,301,607.

[51] Int. Cl.$^6$ .................. B23B 41/00; B23B 47/34; B23B 51/04
[52] U.S. Cl. ........................ 408/67; 408/204
[58] Field of Search .............. 408/204, 205, 207, 67, 408/80, 81, 83; 100/71, 73, 98 A

[56] References Cited

U.S. PATENT DOCUMENTS

| Re. 25,750 | 0/1965 | Adams et al. | |
| 13,606 | 9/1855 | Wyckoff et al. | 408/67 |
| 53,896 | 4/1866 | Stewart | |
| 473,316 | 4/1892 | Hunter | |
| 1,045,126 | 11/1912 | Dain | |
| 1,376,568 | 5/1921 | Nolen | |
| 1,835,551 | 12/1931 | Wright | 408/67 |
| 1,911,741 | 5/1933 | Berry | 408/67 |
| 1,932,239 | 10/1933 | Berry | 408/67 |
| 2,346,220 | 4/1944 | Kienzle et al. | |
| 2,359,881 | 10/1944 | Serr | 408/67 |
| 2,402,230 | 6/1946 | Jutte | |
| 2,525,604 | 10/1950 | Johnson | |
| 2,737,108 | 3/1956 | Galick | |
| 2,738,108 | 3/1956 | Galick | |
| 3,022,723 | 2/1962 | Templeton | |
| 3,379,123 | 4/1968 | Weltner | |
| 3,402,832 | 6/1968 | Wehde | |
| 3,782,273 | 1/1974 | Romer | |

(List continued on next page.)

FOREIGN PATENT DOCUMENTS

| 273138 | 4/1914 | Germany. | |
| 3033925 | 4/1982 | Germany. | |
| 229293 | 11/1985 | Germany. | |
| 664-609 | 5/1979 | U.S.S.R. | |
| 664609 | 5/1979 | U.S.S.R. | |
| 971162 | 11/1982 | U.S.S.R. | |
| 1076022 | 2/1984 | U.S.S.R. | 100/98 A |

OTHER PUBLICATIONS

"NFTA Certifies 105 Forage-Testing Labs", Hay & Forage Grower, Feb. 1992, p. 40.
Behling, Ann, "The Hole Story-Bale Ventilators Are Catching On", Hay & Forage Grower, May 1992, pp. 12-13.
Perry, Ralph, "Bale Ventilator Helps Control, Most, Dust", Hay & Forage Grower, Jan. 1990, pp. 22, 24.

Primary Examiner—Daniel W. Howell
Attorney, Agent, or Firm—Sixbey, Friedman, Leedom & Ferguson

[57] ABSTRACT

A hay baler or bale compressor capable of producing aerated bales of hay which can be effectively stored and shipped. Specifically, the baler includes a packer mechanism which operates to retrieve and compress individual capsules of hay and a plunger or piston that compresses the individual precompressed capsules into a large bale while simultaneously cutting and removing portions of the capsules. The plunger includes at least one tubular cutter which extends through the plunger and projects a desired distance from the face of the plunger. In operation, each time the plunger compresses the plunger load, plugs of hay are cut from capsules making up the load and passed through the tubular cutter to the throat of the baler. If a plurality of holes are formed, proper spacing of the holes allows the hay to breathe and, thus, permits shipment of large and small bales of hay without fear of premature spoiling or fire. Further, a single continuous cut hole may be formed in the resulting bale to provide aeration thereto. In addition, the tubular cutter of the present invention may be located in a position other than the baler plunger to form a continuous hole through a completed compressed bale of hay.

8 Claims, 9 Drawing Sheets

U.S. PATENT DOCUMENTS

| | | |
|---|---|---|
| 4,098,180 | 4/1978 | Tea et al. . |
| 4,185,549 | 1/1980 | Koepnack .......................... 100/98 A |
| 4,621,956 | 11/1986 | Hartman et al. . |
| 4,632,611 | 12/1986 | Burns . |
| 4,674,786 | 6/1987 | Lynch . |
| 4,911,491 | 3/1990 | Naaktgeboren . |
| 4,971,504 | 11/1990 | Klopien . |
| 4,996,899 | 3/1991 | Henderson . |
| 5,009,062 | 4/1991 | Urich et al. . |
| 5,078,059 | 1/1992 | Recker . |
| 5,092,716 | 3/1992 | Omi ..................................... 408/204 |
| 5,101,719 | 4/1992 | Recker . |
| 5,301,607 | 4/1994 | Stromer et al. ................... 100/98 A |

HAY BALER AERATOR

This is a Divisional application of Ser. No. 08/010,008, filed Jan. 27, 1993, now U.S. Pat. No. 5,301,607.

BACKGROUND OF THE INVENTION

1. Technical Field of the Invention

This invention generally relates to the formation of a bale of forage having fiber content which is capable of being shipped over large distances and which exhibits an enhanced ability for storage. More particularly, this invention relates to a hay baler or bale compressor which aerates a bale of hay or straw during the formation of the bale so that it can be shipped without internally igniting or prematurely spoiling before it reaches its final destination.

2. Description of the Prior Art

In recent years, there is increasing interest in hay as a useful and potentially economical means of feeding cattle in locations throughout the United States and the world. Further, straw, which used to be merely burned in the fields, is also recognized as a very useful commodity and has a number of uses, such as insulation. One of the primary inhibitors to effectively utilizing the advantages of hay and straw is the current inability to efficiently ship it over large distances, particularly to locations where hay and straw cannot be effectively grown.

Hay and straw are generally harvested and packed into bales, as is a number of other types of forage of fiber content, such as alfalfa. These bales are formed by hay balers which often form a large bale from individual capsules of hay that are compressed and combined to form the complete bale. Although the creation of a bale allows a user to easily handle a larger amount of hay than if the hay were only loosely held, hay must be able to "breathe" to avoid early spoilage or destruction. Hay only breathes for a distance of approximately eight inches, and even small hay bales are much larger than eight inches, so some of the hay located in the central region of the bale is not able to breathe. This can cause tobaccoing or caramelizing and eventually can cause mold of various degree which can be harmful to livestock. Moreover, because hay and straw make good insulating material, the temperature at the center region of the bale can gradually increase until the heat caramelizes the hay and it actually catches on fire, which also destroys the entire bale and other bales shipped therewith. These problems have, in the past, precluded the shipping of hay or straw over long distances and the storage of hay or straw for desired lengths of time.

Previously, hay and straw were grown in close proximity to those interested in purchasing them in the livestock industry, so the disadvantages associated with the shipment of large bales in an enclosed vehicle were not fully appreciated. However, today a large number of livestock producers and dairymen are located in places, such as Florida, which is not adaptable to growing the type of alfalfa that the Florida livestock producers and dairymen desire. In addition, foreign countries, striving to raise their own livestock, are also interested in purchasing hay to feed them. Now, it is recognized that when hay or straw is shipped from cold climates to warm climates in railroad box cars, for example, the bale sweats causing the moisture content of the bale to increase which reduces the producers ability to preserve the shipped hay. There is a large world market developing for hay and straw which cannot effectively be met, and therefore, the capability to economically ship useful hay is becoming a growing concern to hay producers.

Methods have been developed which attempt to overcome the above-identified disadvantages encountered during the shipment and storage of baled hay. Chemical preservatives have been developed to inhibit hay or straw spoilage, but, to be effective, the preservative must be sprayed evenly over the hay before it is baled in relatively exact amounts. Due to the nature of hay, it is very difficult to evenly apply such a preservative over loose hay.

In addition, a bale of hay can be dried to an extremely low, dry temperature in the field to permit the transport of the hay over long distances. However, when this procedure is done at the time of baling at 9% to 11% moisture, the leaf loss and the nutrition loss is so great that the bale becomes undesirable as feed, particularly for dairy cattle. Therefore, this procedure is also an ineffective means of preserving hay over long distances basically because it defeats the purpose of using the hay if it has limited nutritional value to cattle.

U.S. Pat. Nos. 5,078,059 and 5,101,719 to Recker are directed to hay bale ventilators which are mounted on a plunger of a hay baler. Specifically, the ventilator includes a pointed member extending from the plunger face to form a hole or passageway through consecutively formed segments of hay in the baler. The pointed member, however, is solid in nature and is designed to push or punch out a hole in the segment of hay. Such pressure can damage or destablize the resulting hay bale due to the disruption of the compacted hay.

Furthermore, by pushing a hole through the compressed hay bale, the ventilator is in effect merely creating a tube through the hay bale because individual strands of hay are pushed or crushed in the hole without creating individual strands which are capable of breathing. A passageway formed in this manner really does not solve the problem it is designed to solve. It merely crushes the hay in close proximity to the passageway to actually seal off the rest of the hay bale from the passageway. Moreover, the solid probe provides no means for removing the hay from the hole which results in eventual collapse of the hole. In other words, the hay that has been pushed up sealing off the bale eventually collapses back into the bale as the bale is pushed by the plunger.

An effective means for producing a bale of hay or straw is needed, which enables the bale to be shipped over large distances without premature spoilage. Specifically, an apparatus is needed which prevents bales of hay from internally igniting and allows even the central region of the bale to breathe to prevent the bale from spoiling during shipping or storage.

SUMMARY OF THE INVENTION

A primary object of the present invention is to overcome the deficiencies of the prior art, as described above, and specifically to provide an apparatus capable of producing a shippable bale of hay or straw that will not internally ignite or spoil and will store for long periods of time without damage.

Another object of the present invention is to provide an apparatus which produces a bale of hay or straw that allows all regions of the bale to breathe.

Yet another object of the present invention is to provide a hay baler which includes a plunger element to compress the loose hay into a bale wherein the face of the plunger includes at least one blade element to cut and remove portions of the bale while simultaneously compressing the hay into a bale. This allows the hay located within the center of the bale to breathe without disrupting the structural integrity of the bale.

Still another object of the present invention is to provide a method of producing a bale of hay or straw which includes a step of simultaneously compressing the hay or straw to form the bale and cutting and removing small portions of the hay to provide an aerated bale which is shippable over large distances and storable for a greater length of time than conventionally formed hay bales.

The foregoing objects are achieved by providing a baler which collects harvested forage and compresses it into a bale for storage and shipping. Specifically, the baler includes a packer mechanism which operates to retrieve and compress individual capsules of hay and a plunger or piston that compresses the individual precompressed capsules into a large bale. The plunger also includes at least one tubular cutter which extends through the plunger and projects a predetermined distance from the face of the plunger. The cutter is formed to project into the compressed capsule. In operation, each time the plunger compresses the plunger load, a round cut section of hay is cut from the capsules making up the load and passed through the tubular cutter to the hopper of hay behind the plunger. Because the holes are cut and removed while the hay is being compressed, they do not disrupt the hay, so the hole or holes formed throughout the bale do not collapse.

The plug cut from the bale may also be mechanically retrieved from the cutter. In this embodiment, each time the plunger compresses the plunger load, a round cut section of hay is extracted from each capsule, thus removing and leaving a hole in the capsule making up the load. The removed hay then passes through a tubular cutter to the hopper of the baler behind the plunger. In addition, by cutting the hay from the bale rather than pressing, the hole created in the bale includes a plurality of cut ends or barbs which permit air to pass from the hole through the entire bale, and thus provide effective aeration of the entire bale.

DETAILED DESCRIPTION OF THE PREFERRED EMBODIMENT

Many efforts have been made in recent years to develop effective farming devices for handling the vast amounts of hay produced in this country. Because the price of hay has been steadily increasing in recent years, a means for shipping hay to various regions of the country or overseas is becoming increasingly desirable. One of the problems, however, set forth in greater detail above, is the fact that hay or straw must "breathe" to prevent premature spoiling. The present invention, set forth in greater detail below, provides an effective method and apparatus for forming a large bale of hay or straw or a combination of compressed bales of hay with at least one breathing passage formed therethrough without harmfully affecting the bale structure.

Figure 1:
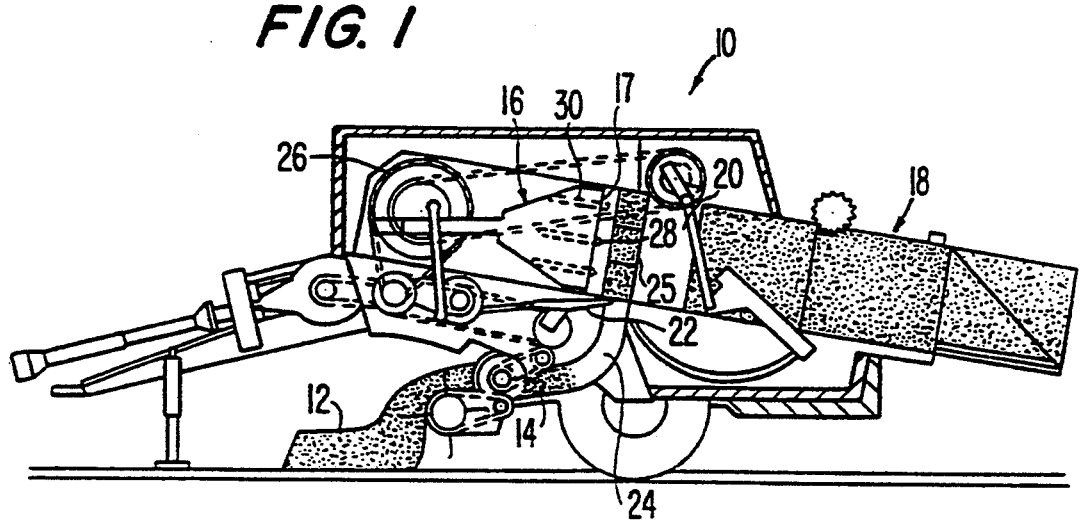
FIG. 1 illustrates a hay baler which includes a plurality of bale cutters designed in accordance with the present invention.

Reference is initially made to FIG. 1 which illustrates a baler 10 for forming bales of hay. It should be noted that all references to hay with regards to baler 10 are equally applicable to straw, or any other forage of fiber content, unless otherwise noted. Moreover, the present invention is also applicable to stationary and mobile compressors for compressing bales of hay into a larger bale, such as for shipping overseas. For purposes of illustration, the baler 10 is a known commercial hay baler having a plunger which has been modified in accordance with the present invention. For example, a similar hay baler is manufactured by Vicon, Inc. of 1225 Franklin Blvd., Cambridge, Ontario VIR6C9, under the designation VICON MP 800 baler. Such balers are also available from other locations by Vicon. The present invention is equally applicable to other similar larger or smaller balers.

Specifically, baler 10 collects hay 12, separates it in a known manner into small, individual capsules 14 and compresses capsules 14 under pressure with a plunger 16. Successive capsules are combined during compression to form a bale 18. Because a bale created by baler 10 is formed under high pressure, the hay near the center of the bale cannot breathe using an unmodified baler unless the hay is extremely dry at the time of baling, which causes leaf and nutritent loss. As set forth above, hay breathes for only eight inches, so much of the hay in a 32"×32" bale, which is a common size for shipping, is not capable of breathing. It should be noted that these larger bales can have a variety of dimensions, such as 32"×32"×96" or 32"×34"×96". This breathing problem is also present in smaller bales, such as "kicker" bales. Without the ability to breathe, the hay is capable of going out of condition before it is delivered or may internally ignite as a result of hay and straw's inherent insulating ability.

Baler 10 includes a bale chamber 20 in which the hay is compressed by plunger 16. A fork 22 is provided for retrieving the hay and forming capsule 14 in a passage 24 leading to bale chamber 20. A bundle 25 of hay capsules shown in FIG. 1 are formed in bale chamber 20 as a result of a packer mechanism 26 which controls the movement and timing of fork 22. Packer mechanism 26 also controls the timing and the movement of plunger 16 which reciprocates within bale chamber 20. To this point, the structure and operation of the baler 10 is conventional.

Figure 2:
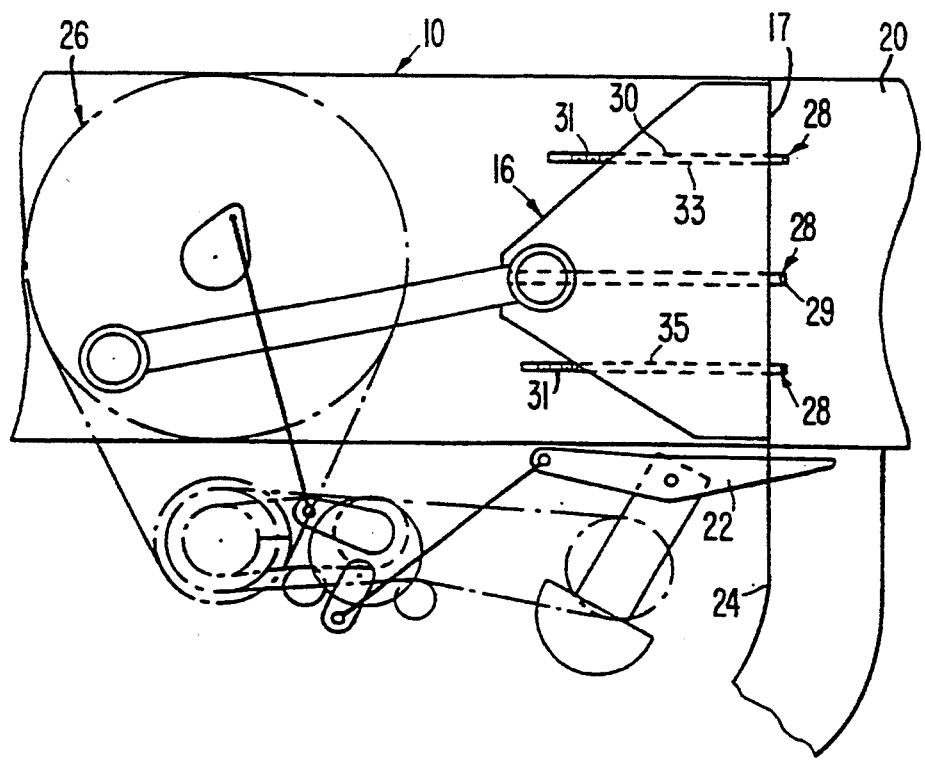
FIG. 2 is a side view of a first embodiment of a hay baler plunger and gear arrangement for the above-illustrated hay baler of FIG. 1.

In accordance with the present invention and with reference to FIG. 2, plunger 16 has been formed to include cutters 28 projecting from face 17 of plunger 16 that engages the hay in bale chamber 20. A single cutter 28 or a plurality of cutters 28 may be present and arranged at various locations on the plunger face to cut small portions out of one or more of the capsules 14 of bundle 25 as the capsule is being compressed. Thus, the plunger compresses bundle 25 into the previously compressed bundles while simultaneously cutting and removing plugs therefrom before the bale is completely formed. Preferably, cutters 28 include an open ended tubular body 30 which extends completely through the plunger so that the cut portions of hay pass through the body and fall back into the throat of the baler. The cutters 28 could be added to the plunger of a variety of different baler units, and therefore, the present discussion is not limited to the baler illustrated in FIG. 1.

By placing cutters 28 on plunger 16, a bale is aerated section by section as it is compressed into its final form. This is very important for maintaining the structural integrity of the bale. Bale density ensures that the bale is tightly packed and rigid to allow trouble free loading. Balers of the type forming bale 18 are capable of producing bales of 2'8"33 2'8" with a bale density in the range of 7.5 to 11.4 lbs/ft$^3$ for straw and 14 to 17.5 lbs/ft$^3$ for hay. However, a variety of bale sizes may be produced depending upon the material and the commercial demands making bale density an important factor in all bale sizes.

Providing cutters having sharpened forward edges 29 on face 17 of plunger 16, as illustrated in FIG. 2, allows the formation of holes cut simultaneously with the compression of the hay capsules so the holes are formed easily. Further, the formation of the holes begins before the capsule is fully compressed, and therefore, when the capsule is fully compressed by the plunger, the cutters are present in the holes formed therein so that the hay surrounding the hole gains added structural integrity due to the compressive forces acting against the cutter. This allows the cutter to be pulled with the plunger away from the compressed capsule without a great deal of disruption, so that a well defined channel open at one end is formed in the capsule.

It should be noted that since a single bale is formed from a plurality of capsules which are sequentially compressed together to form the bale, the thickness dimension of each capsule along a line parallel to the longitudinal axis of the plunger is much less than the thickness of the complete bale along the same line. For bales formed from different sized capsules 14, due to different bale chamber 20 sizes, the cutter 28 may have different lengths and the cutting edge may be, for example, a circle, a diagonal or a fishmouth cut. Since cuts may only penetrate each bundle, the cutters may be arranged so that less than eight inches of compressed hay remains in the finished bale between each cut, and thus the bale is permitted to breathe. Since the cuts do not necessarily have to be deep, the modified plunger of the present invention provides a plurality of small cutaway portions distributed throughout the bale which do not disrupt the integrity of the closely packed hay.

In some instances, the tubular cutters 28 may be formed to project outwardly beyond opposite sides of the plunger 16 as illustrated in FIG. 2, and the outer surface of tubular body 30 may be provided with threads 31 which cooperate with threads 33 formed on cutter receiving channels 35 drilled in the plunger. This permits the cutters to be rotated to vary the distance that they project outwardly from the face 17 of the plunger. In place of threads 31, which cooperate with threads 33, a collar with a set screw with different settings drilled in the tubular body 30 can accomplish the same purpose.

Figure 3:
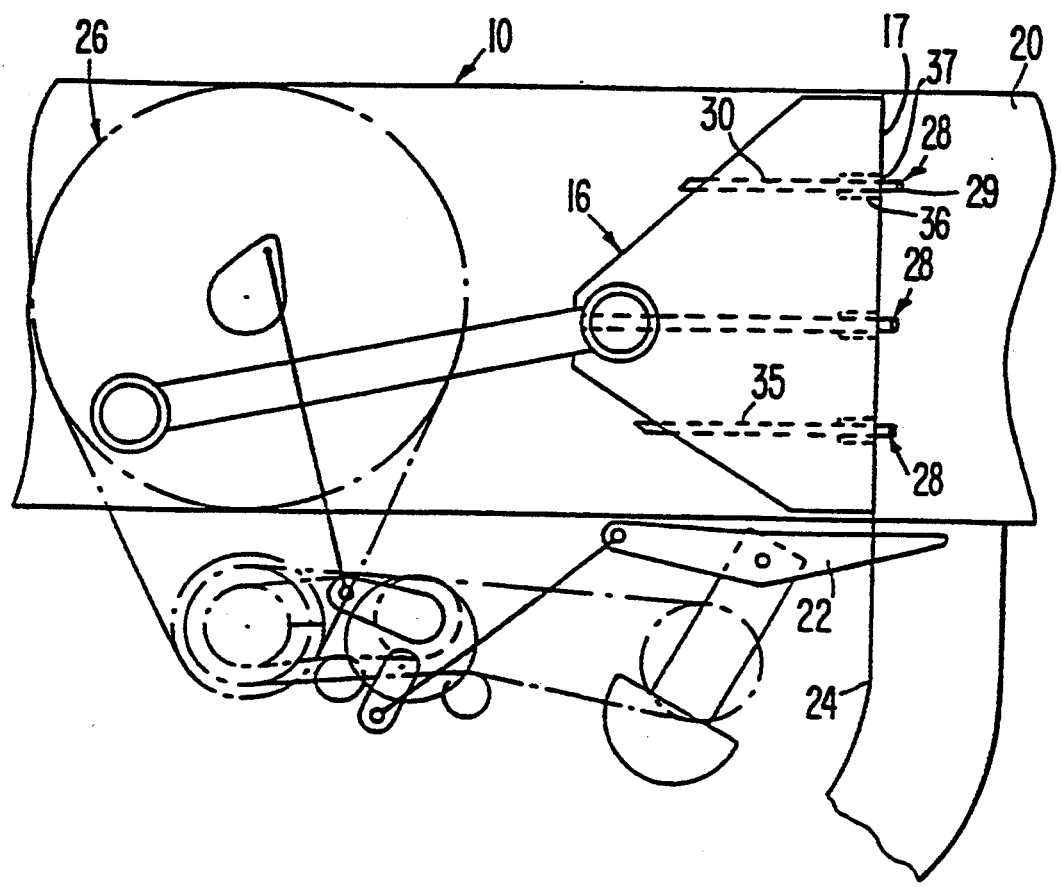
FIG. 3 is a side view of a second embodiment similar to that shown in FIG. 2 including the plunger and gear arrangement for the above-illustrated hay baler of FIG. 1.

Tubular cutters 28 may also be formed as a two component structure, as illustrated in a second embodiment of the present in FIG. 3. In this embodiment, tubular bodies 30 are inserted into cutter receiving channels 35 and welded to each end of plunger 16. Body 30 includes internal threads 36 which threadingly engage external threads 37 included on cutter 28. Therefore, the length of the cutter blade can be varied by inserting cutter 28 with different lengths depending upon the baled material, preferably between two to four inches. Moreover, sharp forward edges 29 provided on each cutter 28 can be produced at any desired diameter depending upon the type of material being processed.

Figure 4:
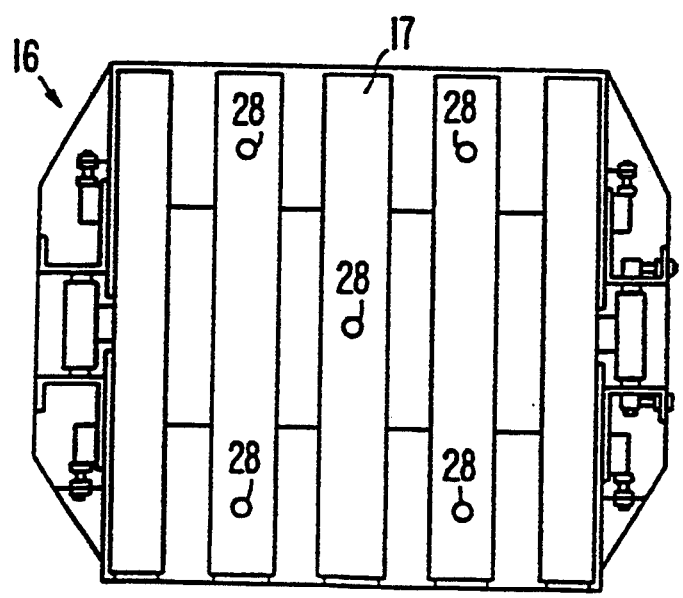
FIG. 4 is an end elevational view of the face of the baler plunger illustrating the placement of the bale cutters.

FIG. 4 shows the face 17 of plunger 16 and the preferred orientation of cutters 28. The cutters are placed less than eight inches apart so that all portions of the bale are properly aerated. The orientation of cutters 28 will vary depending upon the size of the bale produced and the diameter of the cutter. For example, in a bale having dimensions 32"×32"×96", only four cutters are required to provide proper aeration of the bale, namely no more than eight inches of material between each of the cutaway portions. In this view, it can also be shown more clearly the ease in which cutters 28 can be installed into existing bale plungers. The orientation of the cutters, however, may be varied in a number of ways to accomplish the advantageous features of the present invention.

Cutters 28 are designed to cut holes into the hay capsules and remove the cue portions. Cutters 28 may also be used to aerate bales of hay being compressed within a stationary or mobile compressor used to produce large combinations of compressed bales. These compressors are commercially known and are commonly used to produce 100–2000 lb bunches of compressed material for shipping overseas.

Referring to FIGS. 1 and 2, operation of baler 10 becomes apparent. Specifically, bales 18 are formed from capsules 14 positioned within chamber 20 to be compressed by plunger 16 which reciprocates therein. Fork 22 retrieves capsules 14 and precompresses the capsule as it pushes it through a passage 24 to bale chamber 20. Packer mechanism 26 includes a drive mechanism designed to operate both plunger 16 and fork 22 in known manner. Preferably, the fork 22 is made to operate at three times the speed of the plunger 16 and includes a device which for each stroke gives a different position of the fork 22. Each bundle 25 is preferably made up of three capsules 14 and enters the bale chamber 20 after plunger 16 has reached its fully retracted position.

Plunger 16 and fork 22 operate in a combination of plunger positions and fork strokes. The first stroke of fork 22 takes a first capsule 14 and brings it into the top of passage 24, just below bale chamber 20. Plunger 16 is still in a compression position which aids in preventing the first capsule 14 from entering bale chamber 20 prematurely. The second stroke of fork 22 takes a second capsule 14 and places it below the first capsule 14 while plunger 16 is moving from its compression position to its fully retracted position. The position of plunger 16 again prevents the first and second capsule from entering bale chamber 20.

The third and final stroke of fork 22 takes a third capsule and lifts it and the first and second capsules into bale chamber 20 as plunger 16 enters its fully retracted position allowing bundle 25 to enter bale chamber 20. Plunger 16 then compresses bundle 25 while simultaneously cutting a small portion of the hay with cutters 28. The cut hay plug passes through the body 30 of each of the cutters and exits behind the plunger into the hay which will subsequently enter the bale chamber. This process continues until a bale of desired size is formed and the bale can then be tied and dropped from the baler. A variety of bale sizes are available depending upon the dimensions of the baler. A baler designed in accordance with the present invention provides a structurally sound bale of hay which includes a plurality of cut away portions distributed throughout the interior of the bale body to allow adequate aeration of the hay to reduce the likelihood of premature spoilage or internal combustion of the bale.

Figure 5:
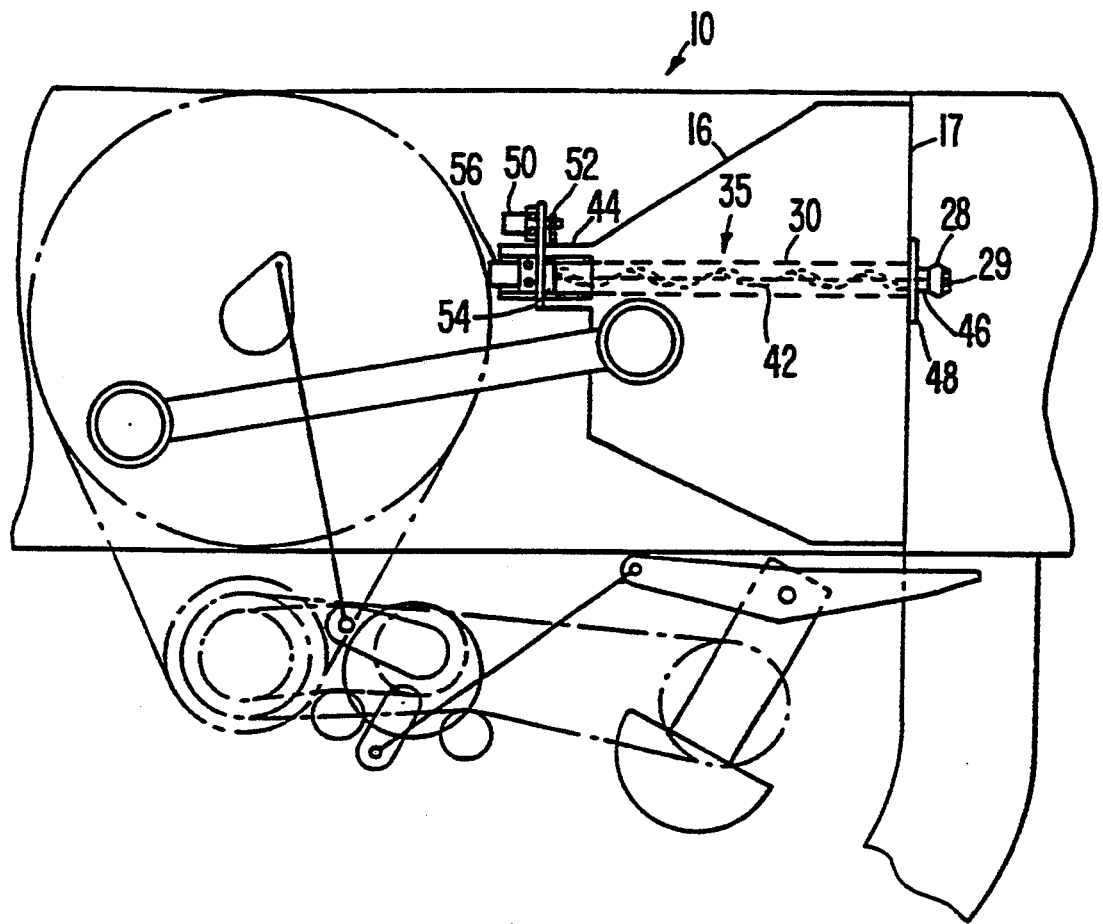
FIG. 5 is a side view of a third embodiment of the hay baler plunger including a single bale cutter having an internal auger and rotating mechanism in accordance with the present invention.

FIG. 5 illustrates a third embodiment of the present invention which includes only a single cutter 28 located substantially in the center of the plunger face 17. Cutter 28 is preferably threadingly attached to tubular body 30 extending within plunger 16 through receiving channel 35. In accordance with this embodiment, a mechanical removing device is provided to remove the cut portion of material from cutter 28. Such removal further ensures that an effective aeration hole is formed in the resulting bale and also ensures that cutter 28 is clear for the next plunger operation. A variety of removal devices could be used for the present invention. For instance, a vacuum device could be used to remove the cut portion by suction.

An auger member 42 is shown in FIG. 5 positioned within tubular body 30. Tubular body 30 and auger member 42 are secured to plunger 16 by support structure 44. Specifically, auger member 42 is designed to rotate within tubular body 30 in order to remove the plug of hay cut by cutter 28.

In addition, tubular body 30 may rotate in a direction opposite to the direction of rotation of auger member 42 to acurately cut the plug of hay. To allow ease in rotation, tubular body 30 may be positioned within plunger face 17 in upper bearing 46. Upper bearing 46 may be an R1 ER31 Sealmaster Bearing having a bore size of 1 15/16" which is secured to plunger face 17 by bearing lock plate 48. In addition, tubular body 30 may be adjustable outwardly away from plunger face 17 or retracted toward plunger face 17 depending upon the baling requirements.

By cutting the plug of hay rather than merely punching or tearing the hay to form a passage therethrough, particularly when the plug is removed by the auger member 42, a cut passage can be formed within the completed hay bale which extends the entire length of the bale. Such a cut bale provides a passage of cut barbs which are similar to the ends of a broom. As a result, the passage includes an infinite number of porous openings which permit air to enter the body of the bale. Solid head probes merely bend the hay fibers up and actually create the equivalent of a solid pipe within the bale. As a result, air is not permitted to escape the interior portions of the bale because the passage formed in such a manner does not create the infinite number of porous passages for air to pass into or from the bale as provided by the present invention.

In addition, the single passage formed by the plunger designed in accordance with the embodiment of FIG. 5 keeps the bale in its natural form. Fibers within the bale are not destroyed, but are instead cleanly cut and removed from the bale. This allows the nutritious leaf portion of the hay to remain in the bale. Further, because the bale is cleanly cut due to the rotating action of both the tubular body 30 and auger 42, the resulting bale maintains its structural integrity and does not create a "banana" bale.

A continuous passage through the completed bale is also advantageous for purposes other than aeration. For instance, if the bale is to be shipped over very large distances, it may still be desirable to spray the bale with a preservative. By providing such a continuous, porous passage, tubular body 30 may include a dispersion member 39 for dispersing a substance into the compressed material. Preservatives can be sprayed using a long nozzle throughout the interior of the bale. In addition a sprayer may be attached directly to tubular body 30 or cutter 28 to spray the preservative as the hay is cut. Further, many livestock producers are interested in supplementing an animal's diet with antibiotics, vitamins, etc. In such an instance, the producer could insert a long tubular dietary supplement into the continuous passage to provide a simple and effective means of ensuring livestock receive the supplement. A tubular salt lick could also be inserted therein. Further, a canister including additives could also be inserted into the hole during shipping to evaporate a gas held within the canister through the bale.

The hole created through the bale may also be used for many other purposes. For instance, the hole could be used for both drying or cooling purposes if proper ventilation was directed therethrough. The hole could also be used to extract the aroma from alfalfa for perfume or a spray additive could be added to the bale to enhance its smell and/or color. A bale including a hole formed by the present invention is also sturdy enough to permit easier movement of the bale by inserting a rod through the hole to lift and move the bale.

In FIG. 5, the rotation of tubular body 30 may be provided by an individual motor 50. Motor 50 may be any conventional motor capable of rotating tubular body 30. An hydraulic orbit motor has been found to be very useful, particularly when the present invention is to be attached to an existing baler. Specifically, an "H" series Char-Lynn motor produced by EATON may be used. Motor 50 is secured to support structure 44 above tubular body 30 which is driven by chain 52 and sprocket 54. External threads 37 of cutter 28, shown clearly below in FIGS. 9-18, should be opposite the direction of rotation of tubular body 30 so that it is not twisted off within the bale during bale formation.

A smaller motor 56 is provided to rotate auger member 42 in a direction opposite to the direction of rotation of tubular body 30. Motor 56 may also be an hydraulic orbit motor, such as an "M" series Char-Lynn motor produced by EATON. A flow regulator, shown below, is also recommended between motor 50 and motor 56 to ensure that appropriate fluid pressure is maintained within each of the motors, particularly in view of the fact that motors 50 and 56 operate at different fluid pressure capacities. Auger member 42 is also driven by a sprocket member 58, shown in greater detail below, Preferably, the sprocket member comprises a duel flexible coupling chain and sprocket. Such an arrangement permits support structure 44 to remain relatively compact due to the limited total area within baler 10 behind plunger 16.

Figure 6:
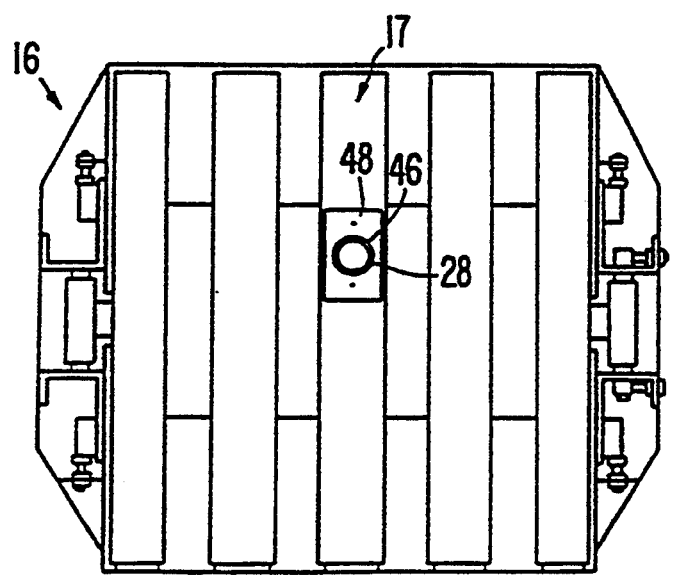
FIG. 6 is an end elevational view of the face of the baler plunger illustrating the placement of the single bale cutter.

FIG. 6, which is similar to FIG. 4 noted above, shows face 17 of plunger 16 and the preferred orientation of cutter 28, as illustrated in the embodiment of FIG. 5. The cutter is preferrably 3" in diameter to form a single hole in the resulting bale that is sufficient to aerate the entire bale, however, a variety of cutter diameters are contemplated depending upon the baling conditions.

The orientation of cutter 28 will vary depending upon the size of the bale produced. For example, in a bale having dimensions 32"×32"×96", only the single cutter is required to provide proper aeration of the bale, namely no more than eight inches of material are provided without access to either the passage or the outside of the bale. Of course, additional cutters 28 which include tubular body 30 and auger member 42 may be included.

Figure 7:
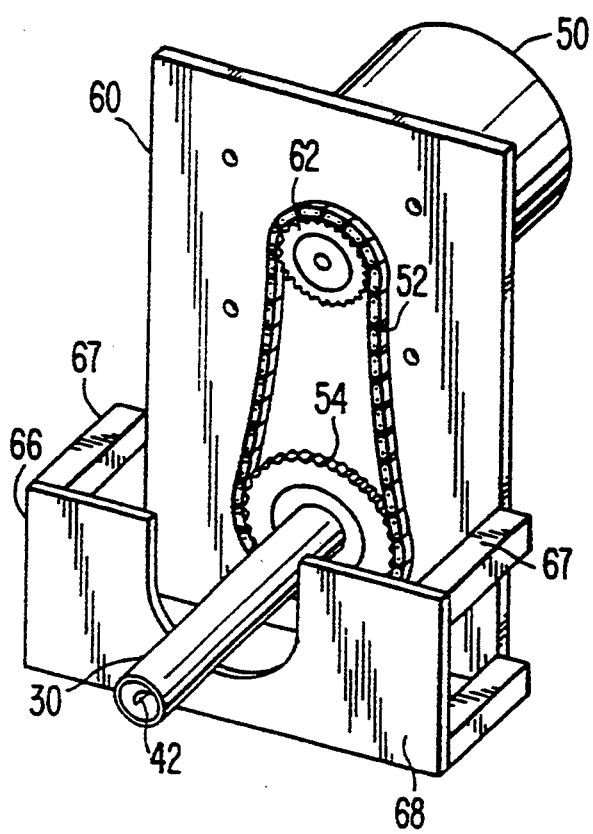
FIG. 7 is an end perspective side view of the support structure of the present invention.
Figure 8:
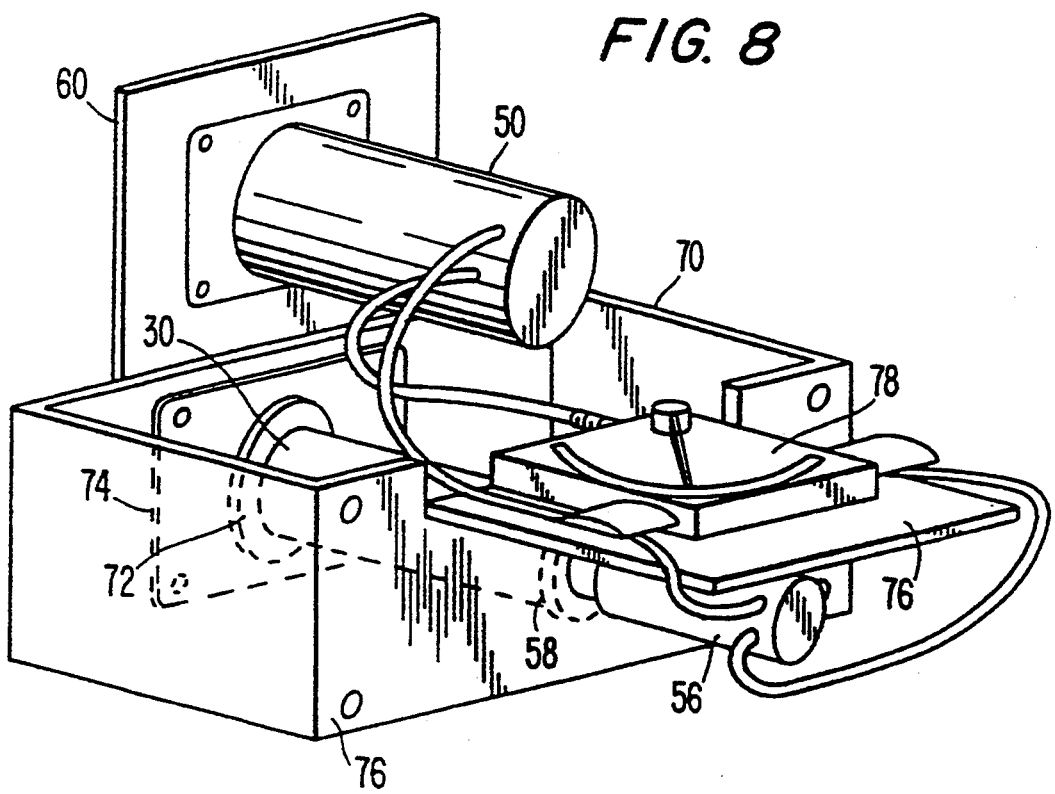
FIG. 8 is an end perspective side view of the side opposite of the support structure shown in FIG. 7.

FIGS. 7 and 8 illustrate support structure 44 which may be attached directly to an existing hay baler plunger 16 such that tubular body 30 extends through the receiving channel 35 to allow cutter 28 to project from plunger face 17. Specifically, FIG. 7 clearly shows vertical plate 60 of support structure 44 which provides a point of attachment for motor 50 extending from the side opposite plunger 16. Motor 50 includes a sprocket 62 which is connected to sprocket member 54 by a single chain 52. Chain 52 can be conventional "40 chain", however modifications to the size and strength of chain 52 are certainly within the scope of the present invention.

Support structure 44 is attached to plunger 16 by extension member 66. Extension legs 67 project face plate 68 a distance sufficient to provide ample clearance for rotation of sprocket member 54 and tubular body 30. Extension member 66 is designed to be attached directly to the rear of plunger 16. For example, the face plate 68 of extension member 66 may be welded directly to the rear portion of plunger 16. Other means of attaching support structure 44 may be equally effective.

FIG. 8 provides a rear view of support structure 44. From this view, it is clear how motor 50 is secured to vertical plate 60. A bracket 70 is secured to vertical plate 60 to extend outwardly therefrom. Bracket 70 is designed to support a lower bearing 72 which permits smooth rotation of tubular body 30 extending through vertical plate 60 and bracket 70. Lower bearing 72 may be secured to bracket 70 by support plate 74 which may be bolted to bracket 70.

Tubular body 30 extends further to motor 56 which powers the rotation of auger member 42. Motor 56 is secured to an L-shaped bracket 76 attached to bracket 70. L-shaped bracket 76 is shown bolted to bracket 70, however, a variety of additional attachments means would be equally effective. As noted above, sprocket member 58 permits rotation of auger member 42 from the power provided by motor 56. A flow regulator 78, noted above, is also secured to L-shaped bracket 76 on the side opposite motor 56.

It should be noted that the configuration shown in FIGS. 7 and 8 is but one of many possible methods of taking full advantage of the limited space provided at the rear portion of plunger 16. The scope of the present invention would include many other means of attaching the desired components to power tubular body 30 and auger member 42, particularly when the present invention is installed as a new component for future balers.

FIGS. 9-21 illustrate a variety of respective examples of cutters 28 which include a circular edge 29 forming the cutting edge thereof to cut the hay fibers. Each of the illustrated cutters are preferably made from a high grade steel to ensure durability and noncontamination of the hay. For example, cutters 28 may be formed from 440 cutlery steel. Moreover, it may be important to heat treat each of the cutters 28, tubular body 30 and auger member 42. Such a finish permits the hay to easily flow over and through the cutter and tubular body without producing heat, while maintaining the sharpness of the cutter after repeated uses.

Preferably, cutter 28 is conical in shape such that the diameter of the sharpened edge 29 is less than the diameter of the portion of the cutter which is adjacent plunger 16. This shape allows the plug of hay cut from capsule 14 to expand slightly to facilitate the removal thereof. Because the plug diameter after the expansion is larger than the diameter of edge 29, the plug will generally remain within cutter 28. In addition, cutter 28 can also include a retaining means, such as lip 38, which is clearly illustrated in FIGS. 9, 10, 12 and 16-21, located on the interior surface of cutter 28. This retaining means further secures the expanded hay plug within cutter 28, so that it will remain within cutter 28 and eventually pass through the body of plunger 16 to fall back into the throat of the baler. It should be understood that any device capable of further retaining the plug of hay within cutter 28 can be used, such as a ring-type hair spring.

Figure 9:
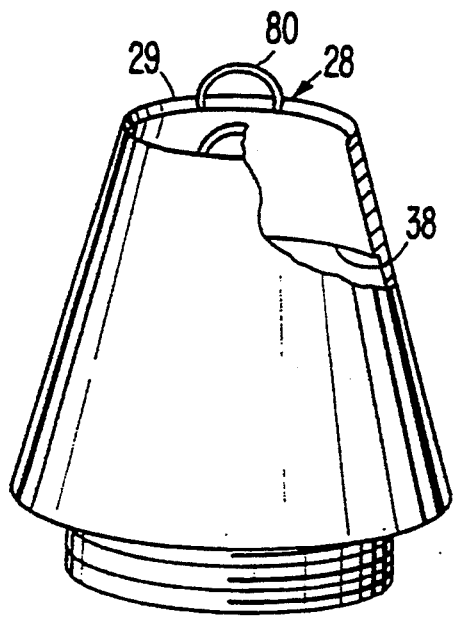
FIG. 9 is a partially cut-away perspective side view of a cutter of the present invention.

The tip of auger member 42, discussed in detail above, should be positioned inside cutter 28 so that it does not extend further than lip 38. This ensures the cut plug is carried away by auger member 42 instead of being pushed back out. In addition, sufficient room is provided in the body of cutter 28 to allow the plug to be cut and expand therein. Lip 38 maintains the plug within cutter 28 until auger 42 catches the plug and carries it through tubular body 30. Cutter 28 may also include extremely sharp cutting ears 80, as shown in FIG. 9, to further facilitate proper cutting of the plug.

Figure 10:
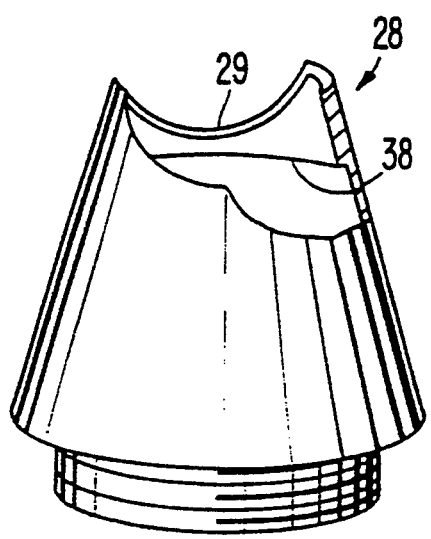
FIG. 10 is a partially cut-away perspective side view of a second embodiment of a cutter of the present invention.
Figure 11:
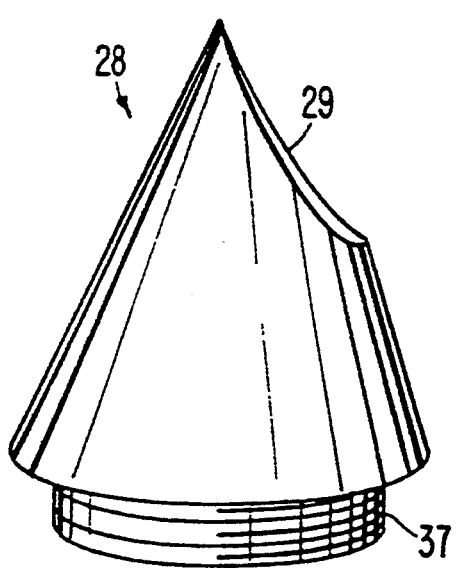
FIG. 11 is a perspective side view of a third embodiment of a cutter of the present invention.

FIG. 10 is provided to illustrate a cutter 28 which includes a fish mouth shaped edge 29. This embodiment could also include a lip 38 or other retaining device, as discussed above. FIG. 11 illustrates a diagonally shaped edge 29.

Figure 12:
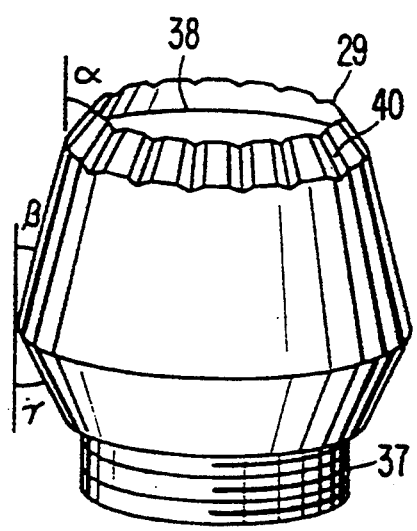
FIG. 12 is a perspective side view of a fourth embodiment of a cutter of the present invention.

FIG. 12 illustrates a cutter 28 which is particularly suited for the second embodiment of the present invention illustrated in FIGS. 5–8. Specifically, this cutter includes lip 38 to retain the hay plug within the cutter to be taken away by auger member 42. Further, sharpened edge 29 includes serrated portion 40 to cut through the hay faster.

The angles used to form cutters 28 are also important to reduce the likelihood of producing heat. For example, angle should preferably be 30 degrees, angle should preferably be 10 degrees and angle should preferably be 20 degrees. Such a design provides sufficient volume within cutter 28 to permit the cut plug of material to slightly expand and, thus be retained therein without being too bulbous. If the volume within the body of cutter 28 is too large compared to the diameter of tubular body 30, plugs of material can become trapped within cutter 28, cause damage to auger member 42 and produce excess amounts of heat.

Figure 13:
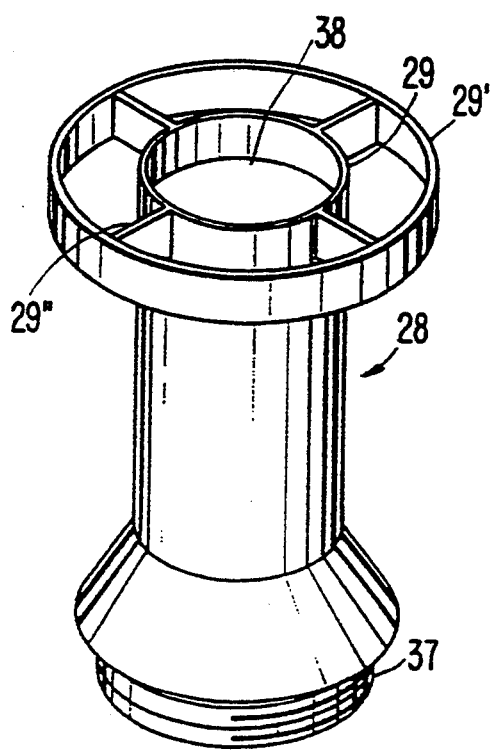
FIG. 13 is a perspective side view of a fifth embodiment of a cutter of the present invention.
Figure 14:
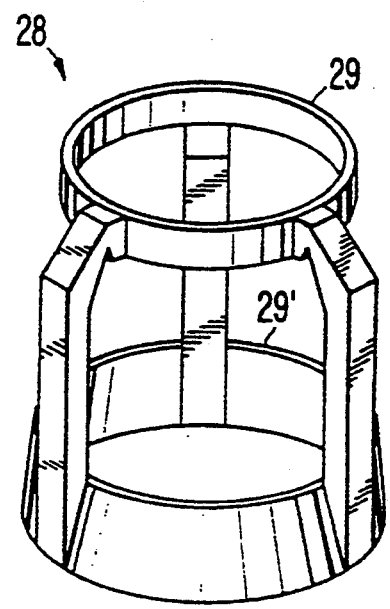
FIG. 14 is a perspective side view of a sixth embodiment of a cutter of the present invention.
Figure 15:
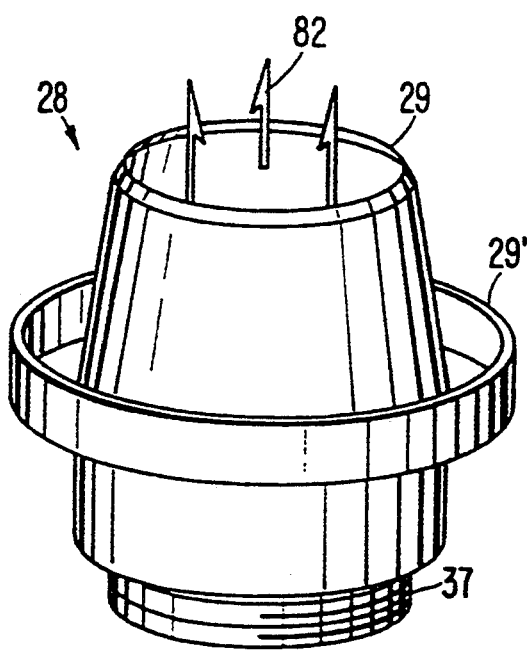
FIG. 15 is a perspective side view of a seventh embodiment of a cutter of the present invention.
Figure 16:
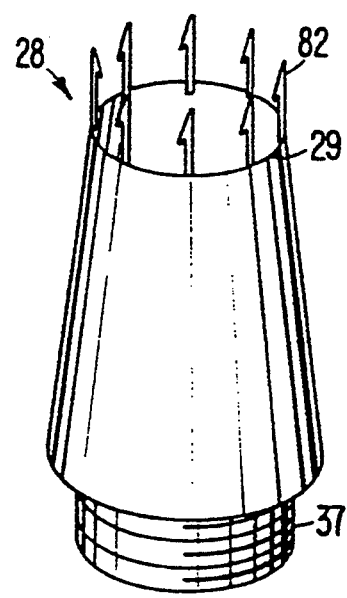
FIG. 16 is a perspective side view of an eighth embodiment of a cutter of the present invention.

FIGS. 13–15 provide examples of cutters 28 which include a second sharpened edge 29' which is sharpened on both sides to cut both on the forward motion of plunger 16 and on its return. In addition, the cutter of FIG. 13 includes a third sharpened edge 29". Further, the cutters of FIGS. 15 and 16 include fish hook extensions 82 to assist in retaining the cut plug of hay so that it does not go back into the bale.

Figure 17:
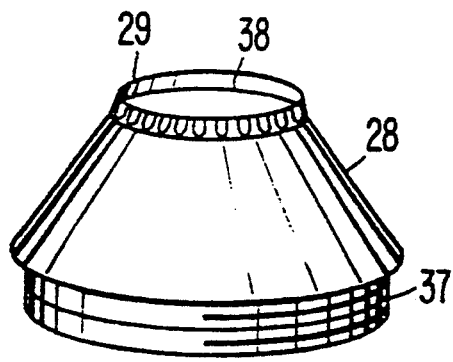
FIG. 17 is a perspective side view of a ninth embodiment of a cutter of the present invention.

FIG. 17 illustrates an embodiment of cutter 28 which includes a minutely serrated or burr type edge 29.

Figure 18:
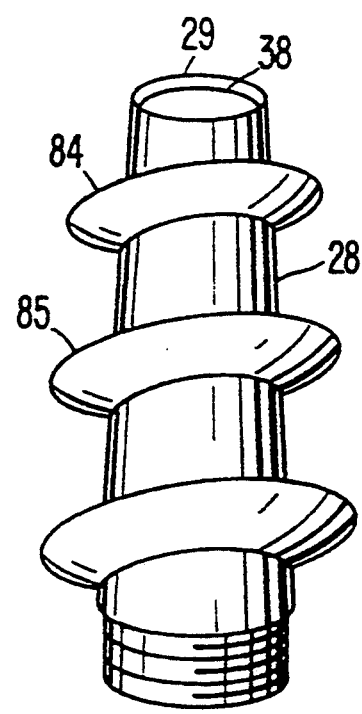
FIG. 18 is a perspective side view of a tenth embodiment of a cutter of the present invention.

Cutter 28 shown in FIG. 18 includes extensions 84 which are similar to the external threads of a self-drilling tool. These extensions further improve the ease at which cutter 28 cuts and removes a plug of hay from the bale and may include a second cutting edge 85 on the exterior of the extensions 84.

Figure 19:
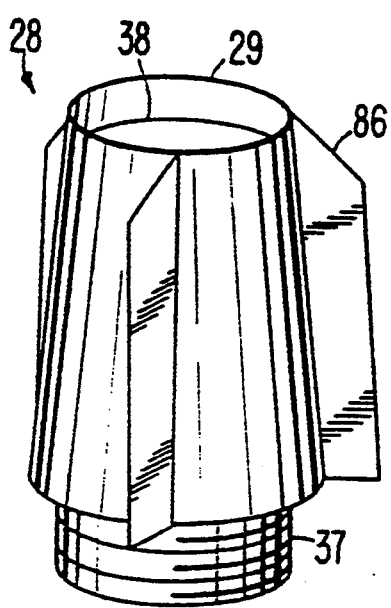
FIGS. 19–21 are perspective side views of an eleventh embodiment of a cutter of the present invention which include a variety of cutting edges.
Figure 20:
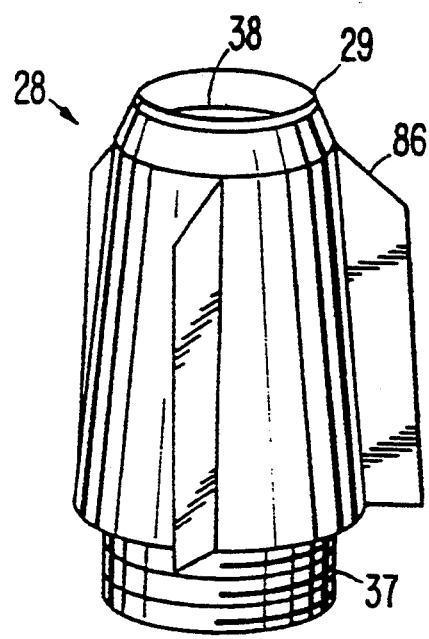
Figure 21:
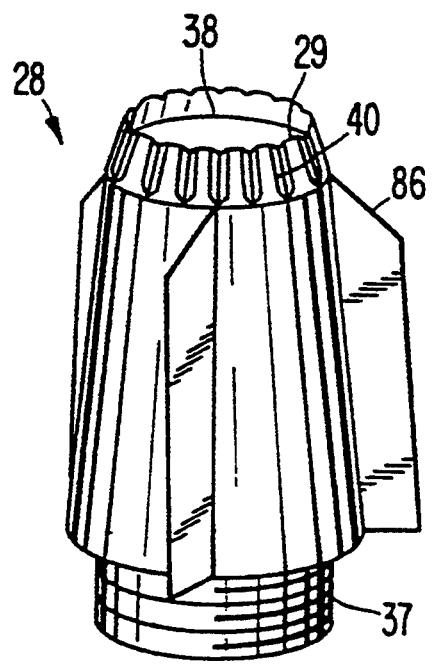

FIGS. 19–21 provide another series of embodiments of cutter 28 which include a plurality of fins 86. Each of the cutters 28 illustrated in these figures include the variety of cutting edges 29 discussed in greater detail above.

In addition to the foregoing, the above-described cutters 28 do not necessarily have to be included on the plunger 16. A system for cutting and removing material from a bale of hay or straw may be located in a variety of locations so long as a true hole is formed in the resulting bale, namely a bale which is cut, rather than punched. Further, an entire mobile unit may be utilized which is capable of picking up bales, forming an aeration hole therethrough and then either collecting or discarding the bale back into the field. Such a mobile unit would be highly advantageous for "kick" bales or for any other size bale.

Figure 22:
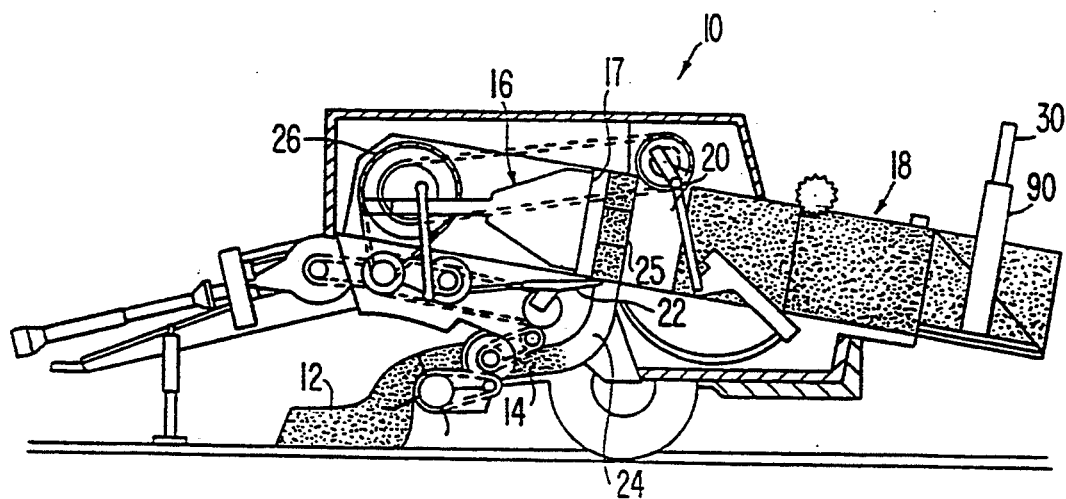
FIG. 22 illustrates a fourth embodiment of a hay baler which includes a bale cutter on the rear of the baler.

For instance, FIG. 22 illustrates a fourth embodiment of the present invention wherein tubular body 30 mounted upon the back of baler 10. An hydraulic system, not shown, may be provided to power the rotation of tubular body 30, if rotation is desired. Further, a removal device, such as auger member 42, may be positioned with tubular body 30 to remove the cut portions of hay. If auger member 42 is utilized the hydraulic system may also be configured to power the rotation thereof.

Figure 23:
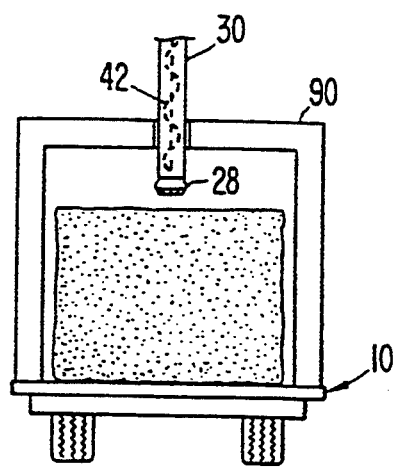
FIG. 23 is an end view of the baler illustrated in FIG. 22.

FIG. 23 shows the location of frame structure 90 on the rear of baler 10 prior to cutting a hole in the bale. Although tubular body 30 is shown mounted from the top of a frame structure 90, the system may be mounted to extend from the side or bottom if sufficient room is provided below the particular baler. This embodiment permits an alternative to making substantial changes to plunger 16 for existing balers. Further, it should be noted that such a frame structure may be a free-standing structure through which finished bales of hay could pass to form a complete, cut hole through the bale to provide sufficient aeration thereto. Moreover, as noted above, the cutting system could be part of a completely separate mobile structure.

The foregoing is considered illustrative only of the principles of the invention. Since numerous modifications and changes will readily occur to those skilled in the art, it is not desired to limit the invention to the exact construction and operation shown and described. Accordingly, all suitable modifications and equivalents may be resorted to while remaining within the scope of the invention.

Industrial Applicability

A hay or straw bale aerator designed in accordance with the present invention has particular utility in agricultural environments. The aerator is especially useful for producing bales of hay or straw which allow proper aeration of the entire bale. This, in turn, enhances the ability to preserve the baled material to allow the shipment of large volumes of hay over longer distances and the capability of storing the material for greater lengths of time. Because the system can be incorporated into existing balers or new balers and new designs, properly aerated bales can be readily available to supply those areas of the world which do not have the resources to produce large amounts of hay.

We claim:

1. An apparatus for cutting and removing material from compressed bales of material such as hay or straw to form at least one hole therethrough comprising:
   a cutter means for cutting and removing a plug of material from the bale;
   a tubular body reciprocally mounted on a support structure and extending from said cutter means mounted thereto to permit material cut by said cutter means to pass therethrough; and
   a removal means cooperating with said tubular body for removing said plug of material, wherein said cutter means is substantially conical in shape to allow expansion of the plug within said cutter means.

2. The apparatus of claim 1, wherein said removal means is an auger member positioned within said tubular body which is rotatable within said tubular body in a first direction of rotation to mechanically remove said plug of material.

3. The apparatus of claim 2, wherein said tubular body is rotatable within said support structure in a second direction of rotation.

4. The apparatus of claim 3, wherein said first direction of rotation of said auger member is in a direction opposite to said second direction of rotation of said tubular body.

5. The apparatus of claim 4, wherein said support structure is mounted to a baler.

6. The apparatus of claim 5, wherein said rotatable tubular body includes a dispersion means for dispersing a substance into said compressed material.

7. The apparatus of claim 1, wherein said cutter means includes a retaining means within said cutter means for retaining said plug within said cutter means.

8. The apparatus of claim 7, wherein said cutter means includes an inner surface having a first portion of a first thickness and a second portion of a second thickness wherein said first thickness is greater than said second thickness creating a circumferentially extending lip along the inner surface of said cutter means.

* * * * *